United States Patent Office 3,092,277
Patented June 4, 1963

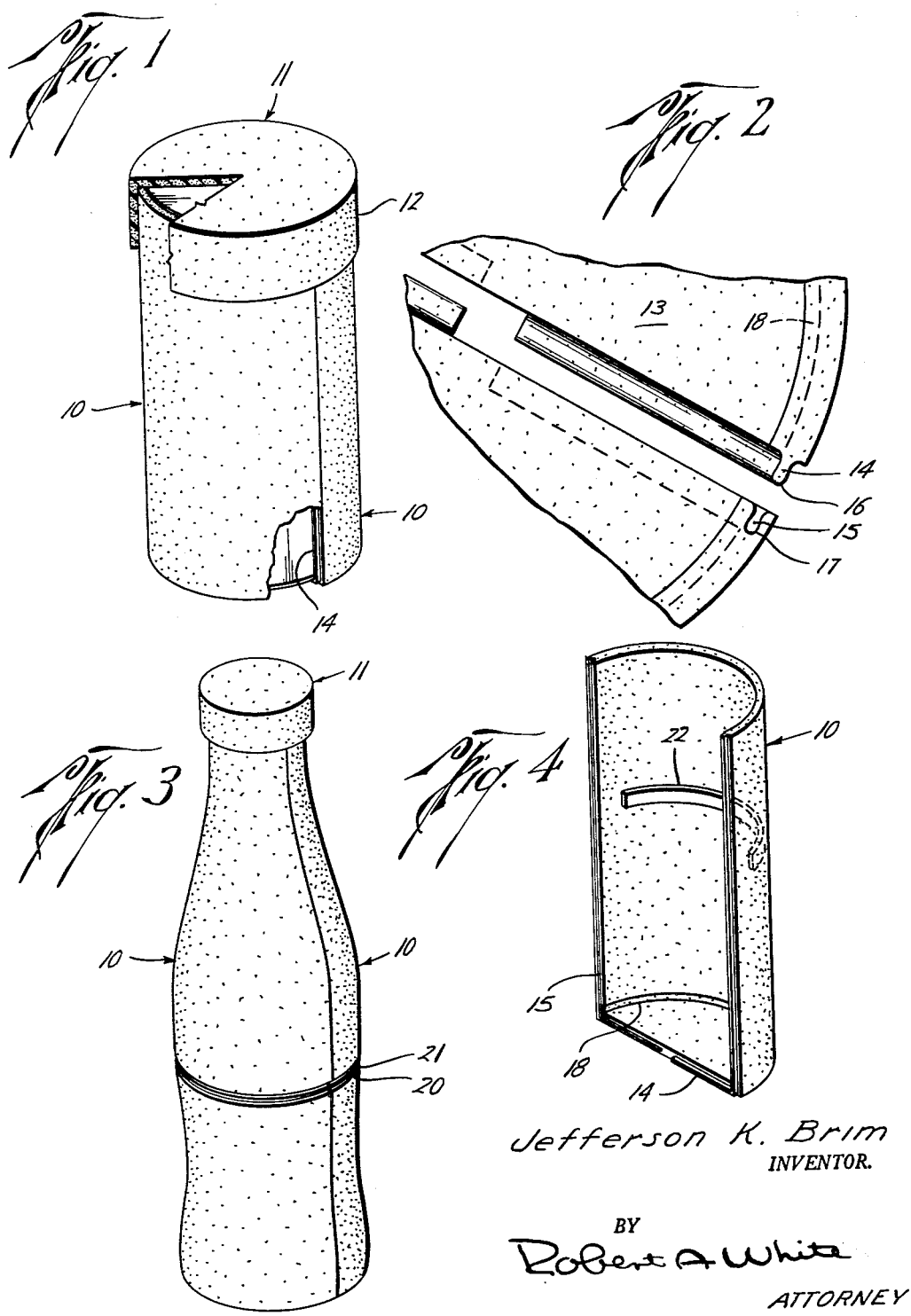

3,092,277
THERMAL JACKET FOR BEVERAGE CONTAINER
Jefferson K. Brim, 811 W. Louisiana, Midland, Tex.
Filed Oct. 7, 1960, Ser. No. 61,158
1 Claim. (Cl. 215—13)

My present invention relates to a thermal jacket for a beverage container, and is intended to provide convenient means for thermally insulating a bottle or can of the type in which beverages are placed for sale and/or consumption.

Recent years have produced considerable change in the marketing practices of commercial beverage companies. It now is quite common to find all manner of both hot and cold beverages offered for sale in either bottles or cans. Many of these containers are of the disposable variety for the convenience of those who wish to carry them in lunch or picnic baskets and avoid the necessity for return. Although those innovations have been well received, it is apparent that the taste of the consuming public still requires that most beverages be either heated or chilled, and many types of portable insulating devices have been developed to create or maintain a suitable serving temperature.

It is to the problem of insulating beverage containers from temperature changes that my present invention is directed, and a primary object is to provide an economical jacket for a beverage container which will maintain the contents thereof at a substantially constant temperature for a considerable period of time.

It is a further object of my invention to provide a convenient jacket which may be placed about a beverage container for thermal insulation and readily removed therefrom when its purpose is served.

It is also an object of my invention to provide a thermal jacket for a beverage container which is of minimum value so that it can be discarded with small loss when its purpose has been once served, but is sufficiently durable to be removed and re-used a number of times if desired.

It is a further object of my invention to provide a thermal jacket for a beverage container which comprises two mating body-enclosing portions to surround and insulate the container, and a cap which may be fitted over the top thereof to complete the thermal seal or placed on the bottom to expose the top for access to the contents of the container, in each of which positions it serves to maintain the body-enclosing portions in a close embrace about the container.

It is a further object of my invention to provide additional or alternate means for holding the body-enclosing portions in position about the container, which means may be readily engaged and released for convenience in affixing and removing the jacket.

It is a further object of my invention to provide a thermal jacket of an expanded polystyrene material which is known to be a highly effective thermal insulator and which may be readily fabricated in any desired shape.

My thermal jacket comprises two body-enclosing portions which are adapted for engagement with each other to surround and form a closely fitting external insulating shield for a beverage container. Beverage cans are cylindrical in shape, and although some beverage bottles vary in diameter from top to bottom, they too are symmetrical about a vertical plane through their center line. Thus the body-enclosing portions may be identical, each defining half of the body which results from their combination. Underturned bottom sections integral with each body-enclosing portion combine to form a complete base for the jacket, and although the contours of various jackets will follow those of the containers for which they are designed, all will have in common the features above described.

In the presently preferred embodiment of my invention, the two body-enclosing portions are provided with mating tongues and grooves along the lines of joinder to prevent heat loss at such points. The top of the jacket is formed by a cap member having a downwardly extending flange which fits over the top of the body portions. The cap member serves a dual function, for it not only seals the jacket under normal conditions but also holds the body portions together and in a snug embrace about the container. When it is desired to open the container and remove the contents, the cap member is moved from top to bottom where it will continue to keep the body portions in proper position.

In certain cases as, for example, where the container and jacket are smaller at the top than at the bottom, the cap will not be of a size to fit over the bottom of the jacket. In this situation, or for convenience in any situation, a resilient member such as a rubber band may be placed around the body portions within a small groove provided for the purpose. An additional method of holding the body portions together and against the container is practical for containers of magnetic material. A small magnetized wire embedded within each body portion will attach itself to the can and hold the jacket in place under normal conditions. Only a small amount of force is necessary to break the magnetic attraction when it becomes desirable to remove the jacket from the can.

My basic design and the additional embodiments described above are shown in the attached drawings in which:

FIG. 1 is a partially cut away perspective view of a thermal jacket intended for use about a cylindrical beverage container such as a metal can;

FIG. 2 is a fragmental top view of two body-enclosing portions ready for engagement with each other, showing the tongue and groove arrangement at their lines of joinder;

FIG. 3 is a perspective view of a jacket adapted to surround an irregularly contoured bottle, showing a resilient member for holding the body portions in place; and FIG. 4 is a perspective view of a single body portion with a magnetic wire fabricated within the inner surface thereof for holding the body portion to a metal can.

Referring now to the drawings, in FIG. 1, my thermal jacket is in place about a cylindrical can. The two identical semi-cylindrical body-enclosing portions are designated by reference numeral 10 and the cap portion by reference numeral 11. It will be apparent that the cap portion 11 has a downwardly extending flange 12 which fits about the two body-enclosing portions and serves to hold them in a snug embrace about the can. When it is desired to expose the top of the can for access to the contents thereof, the cap 11 is removed and inverted so that the flange portion 12 extends upwardly. It then may be slipped over the bottom of the body-enclosing portions 10 and continues to serve its function of holding them firmly together.

The body portions 10 and cap portion 11 are presently of a material known as expanded polystyrene. Its chemical composition and characteristics are well known and hence are not set forth herein. Further, the manner of molding such material in the shapes and to the densities desirable in practicing my invention will be apparent to those skilled in the art. Although the thickness of the jacket should vary with the density of the polystyrene and the degree of insulation desired, I presently prefer to mold the parts to a thickness of approximately one quarter inch with material of a density in the range of from two to four pounds per cubic foot. I have found that a jacket of material meeting these specifications will be economical and will maintain a beverage therewithin at a temperature level suited to most tastes for several hours.

FIG. 2 reveals that each body enclosing portion has a bottom section 13 integral therewith. It also illustrates the tongue and groove arrangement which is common to each body portion. At one side a tongue 14 extends down the length of the side wall and somewhat less than halfway across the diameter of the bottom section. On the opposite wall a mating groove 15 extends similarly down the side wall and across a little less than half of the exposed end of the bottom section.

Although the flanges 12 of cap portion 11 will serve adequately to maintain the body-enclosing portions in engagement with each other, I prefer to provide additional insurance against inadvertent slippage by providing a bulbous protuberance 16 on the end of the tongue 14 and an enlarged area 17 within the groove 15. Expanded polystyrene, the material which I have found to be particularly suitable for use in my thermal jacket, is sufficiently resilient to allow the protuberance 16 on tongue 14 to be slipped into the enlargement 17 within groove 15 without damage to or permanent deformation of either part.

Further protection against slippage of the jackets on cans is provided by a small recessed groove 18 about the inner circumference of the body-enclosing portions 10 immediately above the bottom section 13. This groove accommodates the turned-out rim which is characteristic of beverage-containing cans. As the jacket fits closely about the can, the inner diameter of the cylinder formed by the body-enclosing portions is slightly less than the diameter of the rim of the can and the can will not slip therethrough.

FIG. 3 shows another embodiment of my invention adapted for insulation of an irregularly contoured bottle such as a Coca-Cola container. A tongue and groove arrangement as shown in FIG. 2, with or without the protuberance 16 and enlargement 17, may be employed to hold the body portions together, but as removal of the cap portion might create undue strain on the somewhat resilient tongue and groove device, a firm and continuing attachment between the body-enclosing portions is provided by the resilient member 20 which is carried within a groove 21 formed in the surface of the body-enclosing portions 10. Except for the obvious difference in body contour, the body portions are the same whether intended to enclose a bottle or a can. Each has a bottom section which completes the thermal seal on the base of the beverage container.

Referring now to FIG. 4, an alternate method of holding the jacket in contact with the container is represented by the magnetized wire 22 which is recessed within the interior surface of each body-enclosing portion 10. This wire may be molded with the polystyrene material and will bond thereto to form an integral part thereof.

It will be apparent that each body-enclosing portion is identical, there being no left and right hand members. Therefore, any two body portions will mate to form a jacket, thus providing a decided advantage in sale and storage of these items. Further, they will conveniently nest, one within the other, for stacking.

It is apparent that any of the means which are disclosed herein for holding the body-enclosing portions in engagement, or any combination thereof, may be employed to render my jacket effective in maintaining a thermal seal. It also is apparent that the cap portion employed in my invention need not be of the expanded polystyrene material, as other materials are available which although somewhat less effective in insulating characteristics will serve adequately to maintain the heat shield and hold the body portions together. Finally, although I presently am concerned with beverage containers, my invention will have utility in insulating any container for heated or chilled products. Other minor variations in design or use may occur to those skilled in the art. Thus, it is desired to secure by Letters Patent protection of all such changes and modifications as fall within the scope of the following claim.

I claim:

A thermal jacket for a beverage container comprising two identical semi-cylindrical body portions of an expanded polystyrene material, having each an integral bottom section, said body portions combining to form an open topped cylinder, tongue and groove means on each of said body portions and integral bottom sections for engagement with identical means on the other body portion and integral bottom section, and a cap portion having a cylindrical flange extending outwardly therefrom and over said body portions at either the top or bottom thereof.

References Cited in the file of this patent

UNITED STATES PATENTS

| 1,782,033 | Forbes | Nov. 18, 1930 |
| 2,328,338 | Hauptman | Aug. 31, 1943 |

FOREIGN PATENTS

| 406,698 | France | Feb. 5, 1910 |
| 1,099,267 | France | Mar. 16, 1955 |
| 1,225,774 | France | Feb. 22, 1960 |